US012571148B2

(12) United States Patent
Ji

(10) Patent No.: US 12,571,148 B2
(45) Date of Patent: Mar. 10, 2026

(54) LAUNDRY TREATMENT APPARATUS AND METHOD OF CONTROLLING SAME

(71) Applicant: LG ELECTRONICS INC., Seoul (KR)

(72) Inventor: Baekgeun Ji, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 910 days.

(21) Appl. No.: 17/863,834

(22) Filed: Jul. 13, 2022

(65) Prior Publication Data

US 2023/0020963 A1     Jan. 19, 2023

(30) Foreign Application Priority Data

Jul. 14, 2021     (KR) ........................ 10-2021-0092398

(51) Int. Cl.
  D06F 34/05          (2020.01)
  D06F 33/30          (2020.01)
       (Continued)
(52) U.S. Cl.
  CPC .............. D06F 34/04 (2020.02); D06F 34/28 (2020.02); D06F 39/14 (2013.01); D06F 58/20 (2013.01);
       (Continued)
(58) Field of Classification Search
  CPC .......... D06F 33/00; D06F 33/47; D06F 33/48; D06F 33/50; D06F 33/74; D06F 33/30;
       (Continued)

(56) References Cited

U.S. PATENT DOCUMENTS

| | | | | |
|---|---|---|---|---|
| 4,245,309 A | * | 1/1981 | Kiefer | ................ G05B 19/0428 |
| | | | | 68/12.26 |
| 2019/0214009 A1 | * | 7/2019 | An | ......................... H04L 12/282 |
| 2021/0017687 A1 | * | 1/2021 | Ji | ............................ D06F 34/20 |

FOREIGN PATENT DOCUMENTS

| | | | | |
|---|---|---|---|---|
| CN | 107044031 A | * | 8/2017 | ............. D06F 33/00 |
| CN | 108625094 | | 10/2018 | |

(Continued)

OTHER PUBLICATIONS

English transation of CN107044031 by PE2E Feb. 17, 2025.*

(Continued)

*Primary Examiner* — Deming Wan
(74) *Attorney, Agent, or Firm* — KED & ASSOCIATES, LLP

(57)          ABSTRACT

In a laundry treatment apparatus including a cabinet having an opening formed in one side thereof, a door rotatably coupled to the cabinet to open and close the opening, a drum rotatably provided inside the cabinet and configured to accommodate laundry introduced through the opening, a door lock unit provided inside the cabinet and configured to lock the door when the door closes the opening or release a locked state of the door in order to open the opening closed by the door, a communication unit configured to receive remote inputs of a user for communication with an external device, and a switch unit configured to connect or disconnect an external power, a locked state of the door and connection to the external power are maintained while a user maintains remote control after a preset cycle including rotation of the drum is performed.

16 Claims, 7 Drawing Sheets

(51) Int. Cl.

| | |
|---|---|
| *D06F 33/47* | (2020.01) |
| *D06F 33/48* | (2020.01) |
| *D06F 33/50* | (2020.01) |
| *D06F 33/74* | (2020.01) |
| *D06F 34/04* | (2020.01) |
| *D06F 34/28* | (2020.01) |
| *D06F 39/00* | (2024.01) |
| *D06F 39/14* | (2006.01) |
| *D06F 58/20* | (2006.01) |
| *G05B 19/042* | (2006.01) |
| *G07C 9/00* | (2020.01) |
| *D06F 105/44* | (2020.01) |
| *D06F 105/46* | (2020.01) |
| *D06F 105/58* | (2020.01) |
| *D06F 105/60* | (2020.01) |

(52) U.S. Cl.
CPC ....... *G05B 19/042* (2013.01); *G07C 9/00182* (2013.01); *D06F 2105/44* (2020.02); *D06F 2105/46* (2020.02); *D06F 2105/58* (2020.02); *D06F 2105/60* (2020.02); *G05B 2219/2633* (2013.01)

(58) Field of Classification Search
CPC . D06F 39/00; F06F 34/28; F06F 34/04; F06F 34/05; D05B 23/0283
See application file for complete search history.

(56) References Cited

FOREIGN PATENT DOCUMENTS

| | | |
|---|---|---|
| CN | 108729110 | 11/2018 |
| EP | 3767021 | 1/2021 |
| JP | 2014-161486 | 9/2014 |
| KR | 10-2017-0002891 | 1/2017 |
| KR | 10-2017-0004597 | 1/2017 |
| KR | 10-2021-0009639 | 1/2021 |
| WO | WO 2018/196610 | 11/2018 |

OTHER PUBLICATIONS

Extended European Search Report dated Dec. 19, 2022 issued in Application No. 22183711.5.
Korean Notice of Allowance dated Apr. 17, 2024 issued in Application No. 10-2021-0092398.
Chinese Office Action dated Jan. 23, 2025 issued in Application No. 202210806273.X.

* cited by examiner (b)

LAUNDRY TREATMENT APPARATUS AND METHOD OF CONTROLLING SAME

CROSS-REFERENCE TO RELATED APPLICATION

This application claims the benefit of Korean Patent Application No. 10-2021-0092398, filed in Korea on Jul. 14, 2021, which is hereby incorporated by reference as if fully set forth herein.

BACKGROUND

Field

The present disclosure relates to a laundry treatment apparatus and a control method of the laundry treatment apparatus and, more particularly, to remote control of the laundry treatment apparatus.

2. Background

A laundry treatment apparatus refers to an apparatus developed to wash and dry laundry at home or at a laundry and to remove wrinkles from laundry. The laundry treatment apparatus conceptually includes a washing machine for washing laundry, a dryer for drying laundry, a washing/drying machine with both washing and drying functions, a laundry management machine for refreshing laundry, and a steamer for removing wrinkles on laundry.

In recent years, the need for a laundry treatment apparatus that a user is capable of remotely controlling is emerging due to the diversification of lifestyle and the development of communication technology. That is, there is a growing need for a laundry treatment apparatus capable of remotely performing inputs for laundry treatment instead of direct inputs for laundry treatment to the laundry treatment apparatus.

Remote control refers to remotely performing various control inputs to the laundry treatment apparatus instead of directly manipulating the laundry treatment apparatus by a user. For example, the user may remotely control the laundry treatment apparatus by means of an external terminal that is directly or indirectly connected to the laundry treatment apparatus through communication. In particular, the user located out of a house may remotely perform a control operation by means of a smartphone such that the laundry treatment apparatus installed at home may treat laundry.

To achieve this purpose, the development and sales of home appliances equipped with Internet of Things (IoT) have been recently carried out. Accordingly, various laundry treatment apparatuses for achieving a remote control function using a smartphone of a user have been developed and are on sale.

Korean Patent Laid-Open No. 10-2013-0090252 discloses a remote control device for a washing machine and a method therefor. In particular, there is disclosed a control method in which a remote control mode of the washing machine is automatically released when a washing course selected by a user is completed to thereby block remote control of the washing machine. Eventually, as remote control is released, the door is unlocked. However, if remote control is released after being used once, a washing course does not proceed any more even though the user wants to additionally process the washing course. In other words, it is necessary to improve this problem for user convenience.

However, if remote control is continuously maintained, safety standards for remote control of the International Electrotechnical Commission (hereinafter, IEC) may be violated. According to IEC standards, when use of remote control is released, remote control is possible only when the user manually inputs remote control allowance. This is because door lock is released when use of remote control is completed and, if the user allows remote control again without checking a current state, the door is converted to a door locked state, which may cause a safety problem. For example, the door may be opened in a door unlocked state and a companion animal might enter the washing machine through the door.

Therefore, there is a need to develop a laundry treatment apparatus and a method of controlling the laundry treatment apparatus, which may perform a washing course by remote control once and then continue to perform the washing course by remote control without violating the above-mentioned safety standards.

BRIEF DESCRIPTION OF THE DRAWINGS

Embodiments will be described in detail with reference to the following drawings in which like reference numerals refer to like elements, and wherein:

FIG. 5 (section B) illustrates an example of a locked state in which the latch is inserted into and fixed to the door lock unit;

FIG. 6 is an example of an internal block diagram of a laundry treatment apparatus according to the present disclosure;

FIG. 8 (section A) illustrates an example in which, when a user connects a laundry treatment apparatus to an external power through a power input unit, a control unit activates a communication unit and illuminates the communication unit to indicate that the laundry treatment apparatus is capable of communicating with a smartphone of the user;

FIG. 8 (section B) illustrates an example in which, when a user permits remote control through a remote control input unit, an optical display unit provided in the remote control input unit is illuminated, a remote display unit is illuminated to inform the user that a laundry treatment apparatus is remotely controllable, a lock display unit indicating that a door is locked after the door is converted to a locked state is illuminated, and a communication display unit indicating that the laundry treatment apparatus is communicable with a smartphone of the user is illuminated;

FIG. 8 (section C) illustrates an example in which, when a user does not select a remote control maintenance input until a preset cycle for rotating a drum is terminated, a control unit turns off a remote display unit, turns off an optical display unit provided in a remote control input unit, turns off a lock display unit after releasing a locked state of a door, and turns off a communication unit after deactivating the communication unit, before cutting off power of a laundry treatment apparatus; and FIG. 8 (section D) illustrates an example in which, when a user selects a remote control maintenance input through a smartphone connected through a communication unit of a laundry treatment apparatus until a preset cycle for rotating a drum is terminated, an optical display unit provided in a remote control input unit is illuminated, a remote display unit is illuminated to inform the user that the laundry treatment apparatus is remotely controllable, a lock display unit indicating that a door is locked after the door is converted to a locked state is illuminated, and a communication display unit indicating that the laundry treatment apparatus is communicable with the smartphone of the user is illuminated.

DETAILED DESCRIPTION

Reference will now be made in detail to the exemplary embodiments of the present disclosure, examples of which are illustrated in the accompanying drawings. A construction or a control method of an apparatus to be described below describes embodiments of the present disclosure only and is not intended to limit the scope of the present disclosure. Wherever possible, the same reference numbers will be used throughout the drawings to refer to the same or like parts.

Specific terms used in the present specification are only for convenience of description but do not limit exemplified embodiments. For example, expressions such as "same" and "same as" not only strictly indicate an identical state but also indicate a state including a tolerance, or a difference in the degree to which the same function is obtained. For example, expressions indicating relative or absolute arrangement, such as "in a direction", "along a direction", "in parallel to", "in orthogonal to", "centering on", "concentrically to", and "coaxially to" not only strictly indicate such an arrangement but also indicate a state including a tolerance, or a relative displacement with an angle or distance in the degree to which the same function is obtained.

The present disclosure will be described based on a spatial orthogonal coordinate system with an X-axis, a Y-axis, and a Z-axis orthogonal to each other. Each axis direction (X-axis direction, Y-axis direction, or Z-axis direction) refers to both directions in which each axis extends. Each axis direction with a '+' sign in front thereof (+X-axis direction, +Y-axis direction, or +Z-axis direction) refers to a positive direction which is one of the two directions in which each axis extends. Each axis direction with a '−' sign in front thereof (−X-axis direction, −Y-axis direction, and −Z-axis direction) refers to a negative direction which is the other of the two directions in which each axis extends.

Expressions used herein to indicate directions such as "front (+Z)", "back (−Z)", "left (+X)", "right (−X)", "up (+Y)", and "down (−Z)" are defined by the X, Y, and Z coordinate axes, but these expressions are merely used for better understanding of the present disclosure. That is, it is obvious that the directions may be defined differently depending on where the reference is placed.

The use of terms such as "first", "second", "third", etc. in front of the components described herein is only to avoid confusion between the components. That is, the terms are not related to the order, importance, or master-slave relationship between the components. For example, an embodiment including only a second component without a first component is also feasible. The singular form used herein includes plural forms unless the context clearly dictates otherwise.

Figure 1:
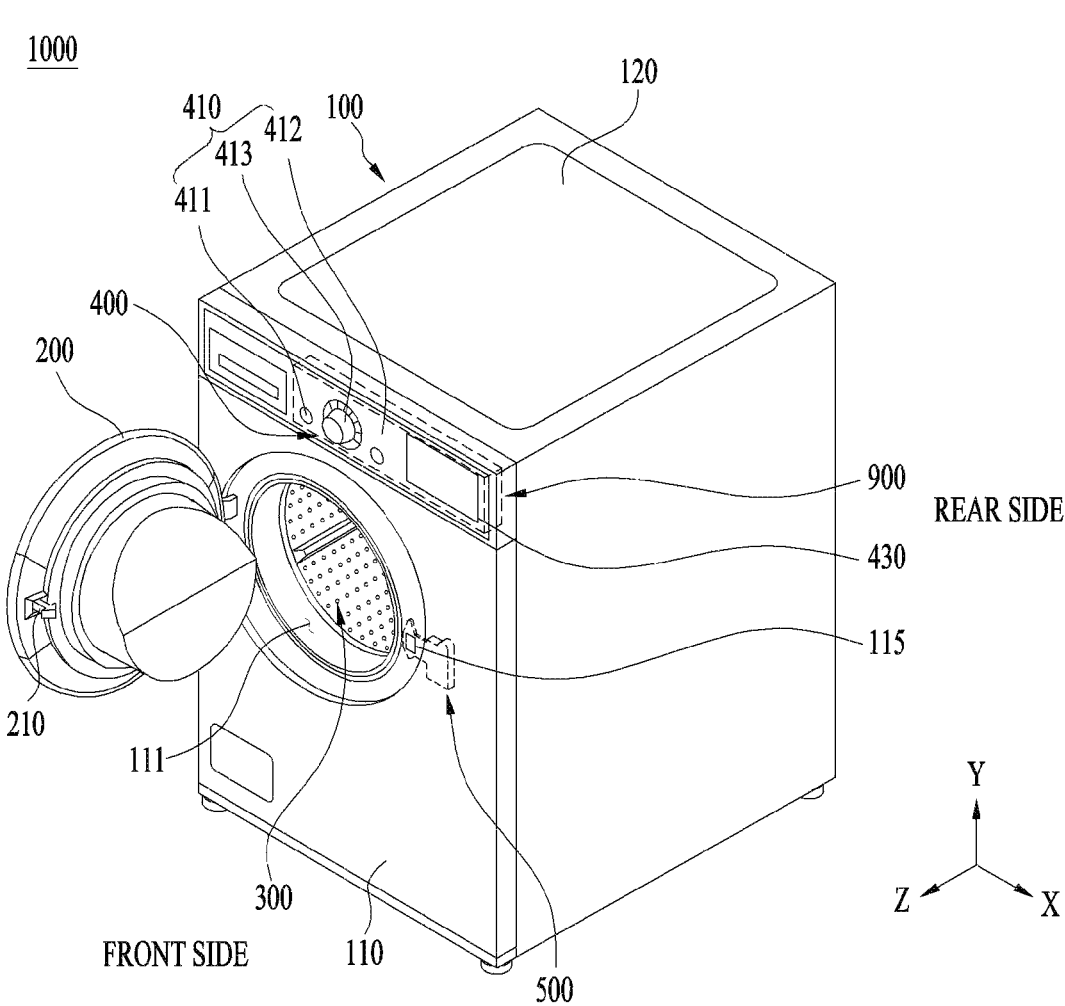
FIG. 1 illustrates an example of a laundry treatment apparatus.

FIG. 1 illustrates a laundry treatment apparatus 1000 according to an example of the present disclosure. The laundry treatment apparatus 1000 includes a cabinet 100 having an opening 111 formed in one side thereof, a door 200 rotatably coupled to the cabinet 100 to open and close the opening 111, a drum 300 rotatably provided inside the cabinet 100 and configured to accommodate laundry introduced through the opening 111, a door lock unit (or door lock) 550 provided inside the cabinet 100 and configured to lock the door 200 when the door 200 closes the opening 111 or release a locked state of the door 200 in order to open the opening 111 closed by the door 200, a communication unit (or communication interface) 910 configured to receive remote inputs of a user for communication with an external device and transmit processing states for the remote inputs, a switch unit 950 configured to connect or disconnect an external power, an input unit (or input device) 410 located on the cabinet 100 and configured to receive manual inputs of the user, an output unit (or output device) 450 configured to output processing states according to the remote inputs and the manual inputs, and a control unit (or controller) 900 configured to control the rotation of the drum 300, locking and unlocking of the door 200 by the door lock unit 550, the communication unit 910, the switch unit 950, the input unit 410, and the output unit 450, according to the manual inputs or the remote inputs of the user.

FIG. 1 illustrates that the opening 111 is positioned on a cabinet front surface 110 defining the front surface of the cabinet 100, but unlike this, the opening 111 may be positioned on a cabinet top surface 120 defining the top surface of the cabinet 100. This may be referred to as a front loading type and a top loading type, respectively.

The opening 111 may be opened and closed by the door 200. The door 200 is rotatably provided on the cabinet front surface 110 to open and close the opening 111. The door 200 may be opened and closed by the user. When the opening 111 is circular, the shape of the door 200 may also be provided in a circular shape to correspond to the shape of the opening 111.

A filter unit (not illustrated) for filtering drained water may be located at one lower side of the opening 111 in the cabinet front surface 110. In addition, a detergent supply unit (not illustrated) for supplying detergent for washing laundry may be located by being biased to one side on an top surface of the opening 111 in the cabinet front surface 110. The detergent supply unit may be provided as a drawer type. Accordingly, the detergent supply unit may operate in a manner that the user draws the detergent supply unit from the inside of the cabinet 100, inserts detergent into the detergent supply unit, and then retracts the detergent supply unit into the cabinet 100.

Next to the detergent supply unit on the cabinet front surface 110, a panel unit 400 that is used to input selection of the user for manipulation of the laundry treatment apparatus 1000 and indicates a processing state of an input command may be located.

Referring to FIG. 1, the drum 300 may be rotatably provided inside the cabinet 100. The shape of the drum 300 may be any shape as long as the drum 300 is rotatable, but may be desirably a cylindrical shape. The outer peripheral surface of the drum 300 may be provided with a plurality of communication holes (not illustrated) which may serve as a passage through which water flows in or out.

Meanwhile, the laundry treatment apparatus 1000 may further include a tub (not illustrated) for storing water supplied from the outside and rotatably having the drum 300 therein. When water is required when performing an arbitrary cycle of rotating the drum, the water supplied from the outside may be stored in the tub and may be supplied through the communication holes.

The laundry treatment apparatus 1000 may further include a water supply unit (not illustrated) for supplying water to the tub and a drain unit (not illustrated) for draining water stored in the tub. In addition, the laundry treatment apparatus 1000 may further include a water supply valve (not illustrated) for controlling water supplied from the water supply unit through the control unit 900.

The laundry treatment apparatus 1000 may further include a driving unit 350 connected to the bottom surface of the drum 300 through the bottom surface of the tub in order to rotate the drum 300. In general, the driving unit 350 may include a motor (not illustrated) that generates rotational force and may be controlled by the control unit 900. The driving unit 350 may rotate the drum 300 to perform a preset cycle by the control unit 900.

The panel unit 400 may include an input unit 410 for sensing inputs of the user and an output unit 450 for displaying processing results or processing states according to the inputs of the user. In the panel unit 400, only a displayed screen through touch in one touch type display may vary without distinguishing between the input unit 410 and the output unit 450.

Referring to FIG. 1, the control unit 900 may be located behind the panel unit 400, that is, inside the cabinet 100. After sensing inputs through the input unit 410, the control unit 900 may output a processing state through the output unit 450 when processing inputs of the user or display a processing result on the output unit 450 after processing is performed.

The input unit 410 may receive inputs of the user and transmit the inputs to the control unit 900. The control unit 900 may process the transmitted inputs and display the processed results on the output unit 450. Electrical signals may be exchanged between the input unit 410 and the control unit 900 and between the output unit 450 and the control unit 900.

In this specification, when it is particularly necessary, inputs are distinguishably used by referring to an input through the input unit 410 as a manual input by the user and an input through the communication unit 910 as a remote input by the user. However, both the manual input and the remote input may be received or sensed and then processed by the control unit 900. For example, the input unit 410 located on the panel unit 400 is for selection by the manual input of the user and, if the user performs a necessary input using a terminal 700 such as a smartphone, this input may be regarded as selection by the remote input of the user.

That is, an input means controls information according to a protocol transmitted through an electrical signal or a command to be processed by the control unit 900 and is merely categorized into the manual input and the remote input according to whether the user uses the terminal 700 such as a smartphone in transmitting the input. In other words, the manual input and the remote input have only a difference as to whether the control unit 900 receives the control information through the communication unit 910.

The remote input may be transmitted as an electrical signal to the laundry treatment apparatus 1000 using the smartphone of the user. In this case, desired information may be exchanged between the smartphone and the laundry treatment apparatus 1000 according to a protocol by the electrical signal.

The input unit 410 may include a power input unit 411 for supplying power to the laundry treatment apparatus 1000 and a course selection input unit 413 for selecting various washing courses provided by the laundry treatment apparatus 1000. The input unit 410 may further include a start input unit 412 for starting a course (or cycle) selected by the user through the course selection input unit 413. The user transmits a manual cycle start input to the control unit 900 through the start input unit 412, and the control unit 900 starts the selected course (or cycle) by rotating the drum.

The power input unit 411 may be provided as a physical switch such as a power button or may be provided in a manner that senses touch by the user. The course selection input unit 413 may select various courses using a rotatable knob or may be provided to touch a screen to select one from among courses displayed on the screen.

When the user presses the power input unit 411, the control unit 900 may activate the switch unit 950. That is, the control unit 900 may connect the switch unit 950 to an external power and then distribute power to components that require power. When the user presses the power input unit 411 again, the control unit 900 may deactivate the switch unit 950. That is, the control unit 900 may cut off the external power through the switch unit 950.

The input unit 410 may further include a remote control input unit 415 (refer to FIG. 3) for remotely controlling the laundry treatment apparatus using a terminal, for example, a smartphone, of the user and a communication activation input unit 417 (refer to FIG. 3) for connecting the laundry treatment apparatus to a communication network to activate communication with the smartphone of the user.

A portion of the input unit 410 and a portion of the output unit 450 may be provided in an interface unit 430 positioned at a portion of the panel unit 400. A portion of the input unit 410 positioned on the interface unit 430 may be provided as a touch type or a physical button type. Alternatively, the interface unit 430 may be provided as a single touch display. A portion of the output unit 450 positioned on the interface unit 430 is identically applied.

To open and close the opening 111, the door 200 may include a door inner surface located in a direction toward the opening 111 among both surfaces of the door 200 and a latch 210 protruding from the door inner surface toward the opening 111. The laundry treatment apparatus 1000 may further include a latch coupling hole 115 formed to penetrate a circumferential part 112 which is a part adjacent to the edge of the opening 111 and formed to correspond to the location of the latch 210 so that the latch 210 may be inserted into the latch coupling hole 115. The door lock unit 550 may be coupled to the cabinet front surface 110 to communicate with the latch coupling hole 115 inside the cabinet 100 so that the door lock unit 550 may be coupled to the latch 210 inserted through the latch coupling hole 115.

Accordingly, when the door 200 closes the opening 111, the latch 210 may be inserted into and then coupled to the door lock unit 550. The door lock unit 550 may convert the door 200 to a locked state so that the door 200 is not opened by external force or vibration when the drum 300 rotates. Thus, if the rotation of the drum 300 is ended and a preset cycle is ended, the control unit 900 may release the locked state of the door 200 through the door lock unit 550, and the user may open the opening 111 by pulling the door 200.

The communication unit 910 (refer to FIG. 2) is provided such that the laundry treatment apparatus 1000 may communicate with an external device. The communication unit 910 may be provided in the form of a communication module, which is a separate device, but the control unit 900 may perform a communication function. The user may remotely control the laundry treatment apparatus 1000 through the communication unit 910. That is, the control unit 900 may receive a remote input from the terminal of the user through the communication unit 910 and perform a command of the user.

The laundry treatment apparatus 1000 includes the switch unit 950 (refer to FIG. 6) for connecting and disconnecting an external power in order to supply or cut off power to the laundry treatment apparatus 1000. Even when a plug of the laundry treatment apparatus 1000 is plugged into an electrical outlet, the control unit 900 may connect and disconnect the external power through the switch unit 950. That is, the switch unit 950 is a kind of relay-type switch and may automatically turn on/off the external power rather than manually turning on/off the external power.

The switch unit 950 may be separately provided from the control unit 900 but may be included in the control unit 900. Although the locations of the switch unit 950 and the communication unit 910 are not illustrated in FIG. 1 under the assumption that the switch unit 950 and the communication unit 910 are disposed inside the control unit 900, the switch unit 950 and the communication unit 910 may be separately provided inside the cabinet.

Figure 2:
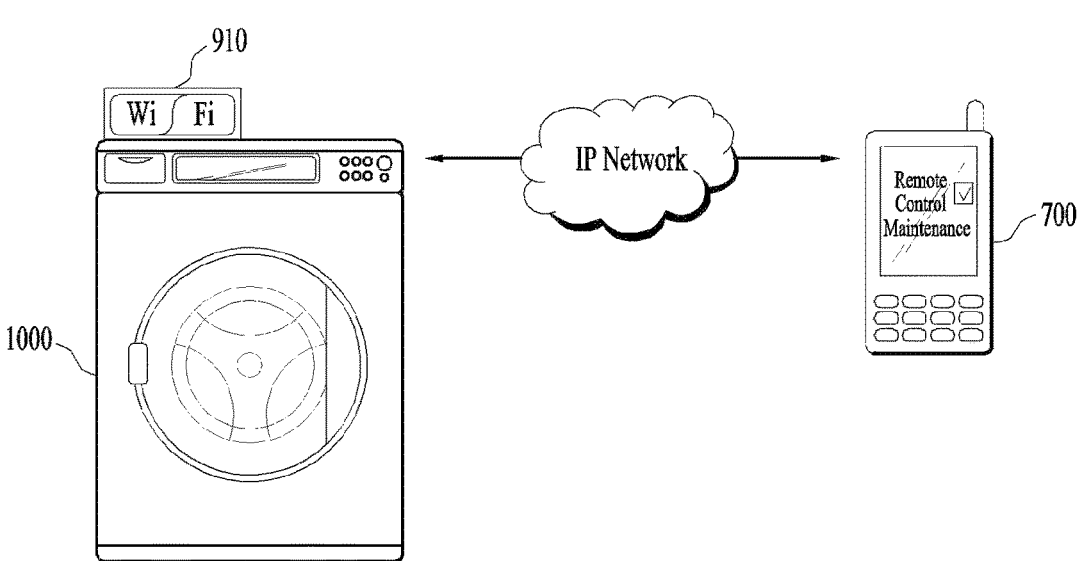
FIG. 2 illustrates an example of a remote control system.

FIG. 2 illustrates a basic configuration of a system of the present disclosure. FIG. 2 illustrates the laundry treatment apparatus 1000 for washing or drying laundry, the terminal 700 for remotely controlling the laundry treatment apparatus 1000, and the communication unit 910 provided in the laundry treatment apparatus 1000 to communicate with the terminal 700.

In an example of FIG. 2, the communication unit 910 is separately provided in the laundry treatment apparatus 1000. However, as described above, the control unit 900 may be integrally formed with the communication unit 910 so as to be in charge of the communication unit 910.

The communication unit 910 may transmit and receive signals through a network such as the Internet to which the terminal 700 is connected using Wi-Fi. The communication unit 910 may have a unique Internet protocol (IP) address. The communication unit 910 may directly communicate with the terminal 700 or indirectly communicate with the terminal 700 through a public server.

The communication unit 910 and the terminal 700 may use not only Wi-Fi but also Bluetooth, near field communication (NFC), a low-power wide area network (LPWAN), a mobile communication network, or a satellite communication network. In addition, the communication unit 910 and the terminal 700 may also communicate with each other via wireless connection or via wired connection such as Ethernet.

The user may control the laundry treatment apparatus 1000 by accessing the server through a separate means such as the terminal 700. Here, the terminal 700 refers to a device, such as a portable phone, a smartphone, a notebook, or a computer of the user, which is provided separately from the laundry treatment apparatus 1000 or the server, and includes a communication module so as to communicate with an external device.

In addition, the terminal 700 may be used to transmit state information of the laundry treatment apparatus 1000 to the user or to transmit various types of information provided by the server to the user. If the terminal 700 is a smartphone, the terminal 700 may remotely control the laundry treatment apparatus 1000 using an application.

The user may remotely control the laundry treatment apparatus 1000 by directly or indirectly accessing the communication unit 910 using the terminal 700. That is, if the terminal 700 transmits a remote input, which is an electrical signal containing control information for directly controlling the laundry treatment apparatus 1000, the control unit 900 may receive or sense the remote input through the communication unit 910 and transmit a command for causing the laundry treatment apparatus 1000 to execute the control information. The control information may be information causing the laundry treatment apparatus 1000 to perform a washing course necessary for washing or drying and other options. The control information may be transmitted to the control unit 900.

In order to control the laundry treatment apparatus 1000 using the terminal 700, the terminal 700 may access the communication unit 910 to transmit request information for allowing and requesting remote control of the laundry treatment apparatus 1000. That is, the laundry treatment apparatus 1000 may receive the request information from the communication unit 910 and allow the terminal 700 to remotely control the laundry treatment apparatus 1000 only when the laundry treatment apparatus 1000 processes the request information. The laundry treatment apparatus 1000 may authenticate the terminal 700 through reception of the request information or check whether the laundry treatment apparatus 1000 is in a remote controllable state, thereby maximizing stability.

The laundry treatment apparatus 1000 may transmit the state information of the laundry treatment apparatus 1000 to the terminal 700 through the communication unit 910. The state information may include a power ON/OFF state of the laundry treatment apparatus 1000, a washing course of the laundry treatment apparatus 1000, an option execution state, and information sensed by a sensor inside the laundry treatment apparatus 1000.

The state information may be directly transmitted to the terminal 700 by the laundry treatment apparatus 1000 through the communication unit 910, or the control unit 900 may transmit the state information of the laundry treatment apparatus 1000 to the terminal 700 when the terminal 700 requests the laundry treatment apparatus 1000 to transmit the status information through the communication unit 910. Thus, the terminal 700 may remotely control the laundry treatment apparatus 1000 from a remote location.

A plurality of laundry treatment apparatuses 1000 may be provided, and the terminal 700 may be provided to individually control each of the plurality of laundry treatment apparatuses 1000. For example, the laundry treatment apparatuses may be disposed in a commercial laundry and the terminal 700 may be provided to control all of the laundry treatment apparatuses 1000. State information of the plurality of laundry treatment apparatuses 1000 may be displayed on the terminal 700, and the terminal 700 may transmit control information to each of the plurality of laundry treatment apparatuses 1000.

Figure 3:
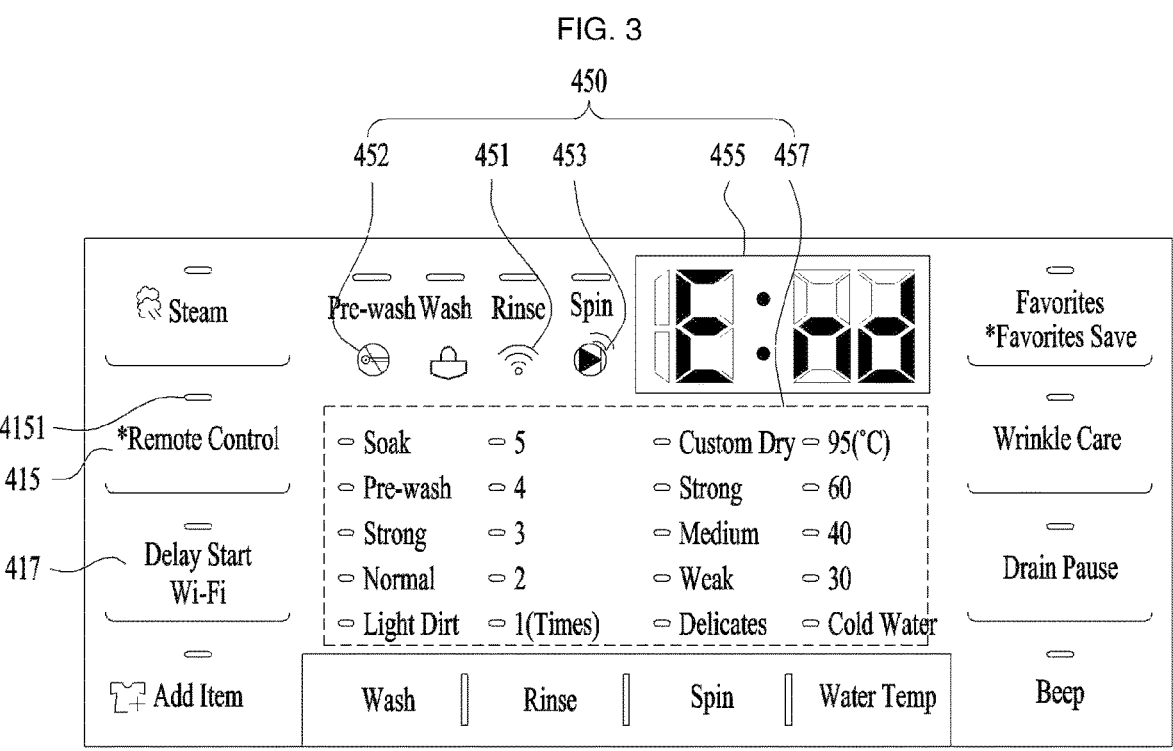
FIG. 3 illustrates an example of an interface unit in a panel unit.

FIG. 3 illustrates an example of the interface unit 430. A portion of the input unit 410 may be located at both sides and a lower side of the interface unit 430, and the output unit 450 may be located at the central and upper side of the interface unit 430. This considers only design, and arrangement of the input unit 410 and the output unit 450 may be different from the above example. In addition, the input unit 410 may be provided in a physical button type or a touch type. The output unit 450 may indicate a current course state by turning on/off an optical display unit provided above a detailed course description, display the remaining time of a currently selected course, and display a currently activated function.

To this end, the input unit 410 may further include the remote control input unit 415 for allowing the user to manually perform remote control and the communication activation input unit 417 for allowing the user to manually activate the communication unit. In addition, the output unit 450 may include a remote display unit 453 for indicating whether remote control is activated, a communication display unit 451 for indicating whether the communication unit is activated, and a lock display unit 452 for checking whether the door is locked. The output unit 450 may further include a time display unit 455 for displaying the remaining time of a selected operation.

Referring to FIG. 3, the remote display unit 453, the communication display unit 451, and the lock display unit 452 are exemplarily illustrated as icon-shaped lights indicating respective processing states. The remote display unit 453, the communication display unit 451, and the lock display unit 452 may directly display states thereof using respective icon-shaped light emitting diodes (LEDs). In contrast, a film or cover made of an opaque material may be attached to a general LED such that light passes through a portion corresponding to an icon shape. Therefore, when the LED is turned on, light passes through only the icon shape corresponding to the LED so that a corresponding icon may be displayed. On the other hand, the remote display unit 453, the communication display unit 451, and the lock display unit 452 may be implemented in a manner of providing optical display units using LEDs near printed menus to indicate a current state by turning on/off the optical display units.

As an example, if respective icons corresponding to the remote display unit 453, the communication display unit 451, and the lock display unit 452 are turned on, this may indicate a state in which remote control is possible, a state in which communication is possible, and a state in which the door 200 is locked, respectively.

When the user directly selects a remote control allowance input, which is control information allowing remote control, through the remote control input unit 415, the remote control input unit 415 may sense the remote control allowance input and transmit the input to the control unit 900. After confirming the remote control allowance input, the control unit 900 illuminates an optical display unit 4151 provided in the remote control input unit 415 in order to indicate that remote control is activated and lights on the remote display unit 453. Then, the control unit 900 will wait for another remote input from the user through the communication unit 910.

The user should manually input the remote control allowance input through the remote control input unit 415. This is to satisfy the safety standards of home appliances. Here, an input may refer to pressing a button or touching a corresponding part. In addition, sensing means that the control unit 900 receives control information, which corresponds to touching of a desired part of the panel unit 400 by the user or pressing of a desired button by the user and is generated as an electrical signal, and determines an input related to the control information. Such input information or control information may be finally sensed and then processed by the control unit 900. For example, if the optical display unit 4151 indicating the state of the remote control input unit 415 is turned on, this means that remote control is activated or maintained so that the control unit 900 may receive a remote input of the user through the communication unit 910.

Similar to the remote control input unit 415, the user should manually input a communication activation input through the communication activation input unit 417. That is, the user may press a button provided in the communication activation input unit 417 or touch a touch area of the communication activation input unit 417, so that the communication activation input unit 417 will sense the communication activation input and transmit the input to the control unit 900.

For example, if an optical display unit indicating the state of the communication activation input unit 417 is turned on, this means that the control unit 900 has been connected to a communication network such as an Internet network through the communication unit 910.

Upon receiving the communication activation input, the control unit 900 connects the communication unit 910 to a designated communication network or the Internet network, so that the control unit 900 may receive remote control through the terminal 700. This may be referred to as a state in which the communication unit 910 is activated, i.e., a state in which the communication unit 910 is communicable with an external device.

Display units for displaying a current cycle corresponding to any one of pre-washing, washing, rinsing, and spin-dry cycles may be located above the remote display unit 453, the communication display unit 451, and the lock display unit 452. In addition, the time display unit 455 may be positioned at one side of the lock display unit 452. The time display unit 455 may display remaining time of a current cycle of rotating the drum, for example, any one of pre-washing, washing, rinsing, and spin-dry cycles. After the cycles are completed and before the power is turned off, the control unit 900 may display a character such as "END" through the time display unit 455.

A detailed display unit 457 for controlling each cycle in detail may be located at the center of the interface unit 430. In addition, an adjustment input unit for manipulating the detailed display unit 457 may be located below the interface unit 430.

For example, in order to adjust the number of times of rinsing, as the user repeatedly presses a button written as Rinse on the adjustment input unit, optical display units corresponding to portions written as 5, 4, 3, 2, and 1 (times) are changed on the detailed display unit 457, so that the user may change a set value to a desired number of times of rinsing.

Referring to FIG. 3, when the user touches a corresponding part of the communication activation input unit 417 and the remote control input unit 415 (or long-presses a corresponding button), the control unit illuminates respective optical display units, and the communication unit 910 is activated. The control unit 900 may sense or receive a remote input as the remote control through the terminal 700 of the user is activated through the communication unit 910.

When the user touches again a corresponding part of the communication activation input unit 417 and the remote control input unit 415 (or presses again a corresponding button), the control unit turns off the respective optical display units, and the communication unit 910 is deactivated. The control unit 900 may not communicate with the communication unit 910, and the remote control through the terminal 700 of the user may also be deactivated, so that the control unit 900 is incapable of sensing or receiving a remote input.

Figure 4:
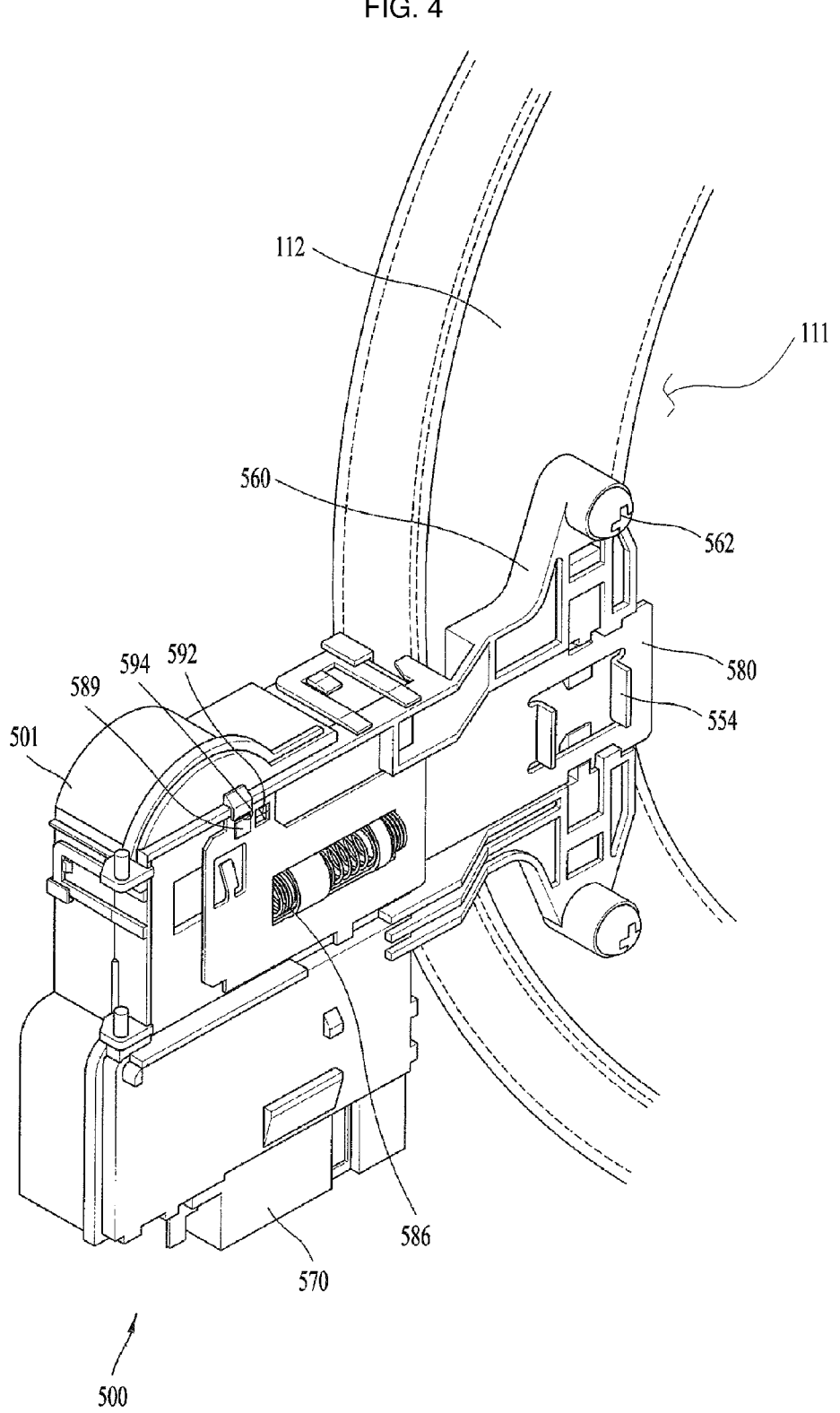
FIG. 4 illustrates an example of a door lock assembly coupled to the inner surface of a circumferential part.

FIG. 4 illustrates an example of a door lock assembly 500 coupled to the inner surface of the circumferential part 112. FIG. 4 is a stereoscopic view of the cabinet 100 viewed in a direction of the cabinet front surface 110 from the inside of the cabinet 100.

The door lock assembly 500 may include the door lock unit 550 for locking the door 200 by fixing the door 200 when the door 200 closes the opening 111 or opening the door 200 by unlocking the fixed door 200. The door lock assembly 500 may further include a door sensing unit 510.

The door sensing unit 510 may further include a latch inserter 551 communicating with the latch coupling hole 115. The latch 210 may be inserted into the latch inserter 551.

In addition, the door sensing unit 510 may be coupled to the rear surface of the circumferential part 112, i.e., the rear surface of the cabinet front surface 110, so that the latch 210 may be inserted through the latch coupling hole 115. To this end, the door sensing unit 510 may further include a door lock body 501 defining an external shape, a coupler 560 for coupling the door lock body 501 to the cabinet front surface 110, and a coupling member 562 for coupling the coupler 560 to the cabinet front surface 110.

When the user closes the opening 111 using the door 200, the latch 210 may be inserted through the latch coupling hole 115 and the latch inserter 551, and the latch 210 may be hook-coupled to the door lock unit 550 by a hook head 2105 provided at a free end of the latch 210. In this case, a latch contactor 554 in a slider 580 may contact the inserted latch 210.

The door lock unit 550 may include a slider 580 that is movably provided as the latch 210 is inserted into the latch inserter 551, a coil spring 586 for moving the slider 580 in an opposite direction to a moving direction by restoring force when the latch 210 is separated from the latch inserter 551, and a fixing pin 589 for fixing the moved slider 580.

In addition, the slider 580 may include the latch contactor 554 that is provided in a direction from the latch inserter 551 toward the inside of the cabinet and contacts the latch 210 inserted through the latch inserting part 55 and include a lock hole 592 formed through the slider 580 such that the fixing pin 589 may be inserted thereinto. When the fixing pin 589 is inserted into the lock hole 592, the slider 580 may be fixed. When the fixing pin 589 exits from the lock hole 592 and the slider 580 is returned to an original position thereof by restoration force of the coil spring 586, the locked state of the door 200 may be released. A more detailed operation mechanism will be described later with reference to FIG. 5.

In addition, the door lock unit 550 may further include a fixing pin mover 590 for inserting the fixing pin 589 into the lock hole 592 in order to control the movement of the slider 580. Meanwhile, the door lock unit 550 may further include a release hole 594 for fixing the slider 580 in a state in which the door 200 is released from the door lock unit 550. The control unit 900 may convert the door 200 to a lock or unlocked state using the door locking unit 550, in particular, the fixing pin mover 590.

In addition, the door lock assembly 500 may further include a terminal part 570 for supplying power to the door lock unit 550 and the door sensing unit 510 and exchanging control information with the control unit 900. Specifically, the control unit 900 may control the movement of the fixing pin mover 590 through the terminal part 570.

Figure 5:
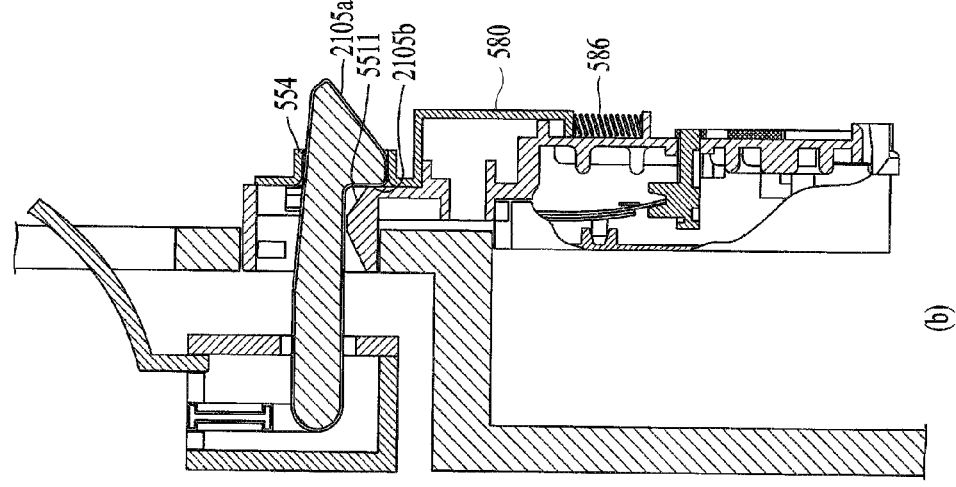
FIG. 5 (section A) illustrates an example of an unlocked state of a door lock unit from which a latch is separated.
Figure 5:
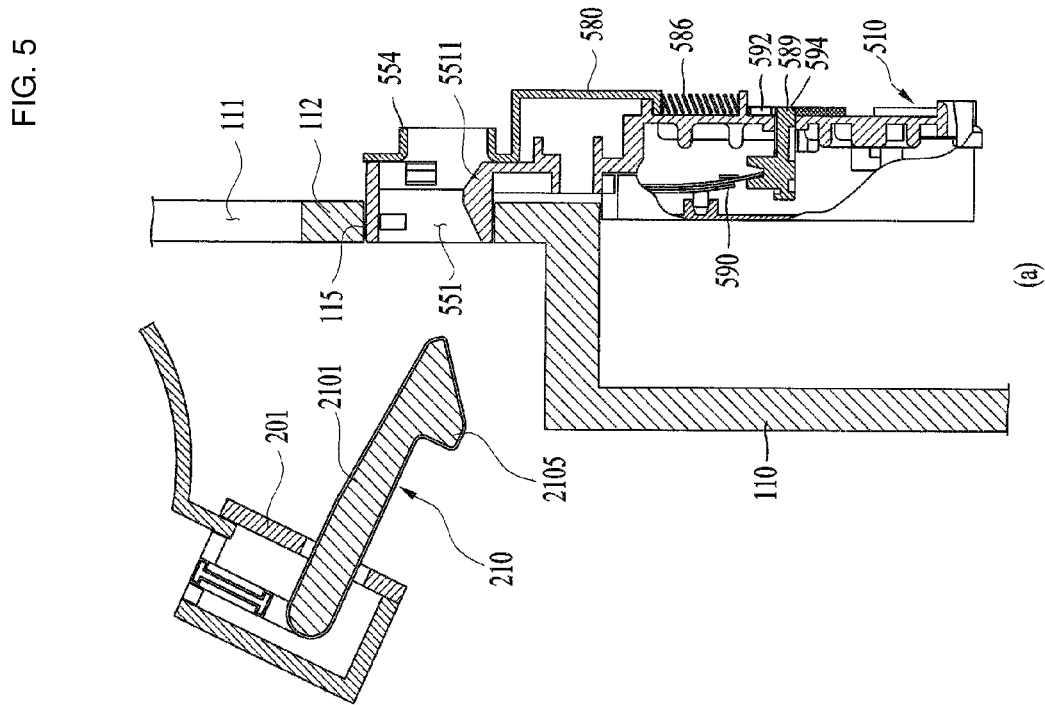

FIG. 5 (section A) illustrates an example of a state in which the latch 210 is separated from the door lock unit 550. FIG. 5 (section B) illustrates an example of a locked state in which the latch 210 is inserted into and fixed to the door lock unit 550. A description of the door lock unit with reference to FIGS. 4 and 5 (sections A and B) is only exemplary and may be implemented in other ways.

Referring to FIG. 5 (sections A and B), the latch 210 may include a latch body 2101 protruding from the door 200 toward the opening 111 and the hook head 2105 integrally formed with the latch body 2101 in a hook shape at a free end of the latch body 2101. The latch 210 may be coupled to a door inner surface 201, or a portion of the latch 210 may be inserted into the door 200 and coupled as illustrated in FIG. 5 (section A).

The latch coupling hole 115 may be positioned in the circumferential part 112 with a height at which the latch 210 may be inserted. The latch inserter 551 may be inserted into the latch coupling hole 115 to contact the inner surface of the latch coupling hole 115. A portion of the latch inserter 551 may include a bump 5511 provided with a curved surface so as to be hook-coupled to the hook head 2105.

The hook head 2105 may include a hook head front part 2105a inserted into the latch inserter 551 via the bump 5511 and a hook head rear part 2105b contacting the bump 5511 so as to be hooked to the bump 5511. The hook head front part 2105a may have a smaller (? Larger) inclination than the hook head rear part 2105b. This causes the hook head 2105 to be well inserted into the latch inserter 551 and then the hook head 2105 caught on the bump 5511 to exit only when force greater than or equal to predetermined external force is applied. To this end, an angle between the latch body 2101 and the hook head rear part 2105b may be designed to be almost vertical.

Referring to FIG. 5 (section A), when the latch 210 is separated from the latch inserter 551, the slider 580 may be located at a first position, which is an original position, by the coil spring 586. In this case, the fixing pin 589 may be inserted into the release hole 594 to block the movement of the slider 580.

Referring to FIG. 5 (section B), when the latch 210 is inserted into the latch inserter 551, since the fixing pin 589 is inserted into the release hole 594, the slider 580 will not move. Since the latch contactor 554 does not contact the hook head 2105, when the user pulls the door by predetermined external force, the latch 210 is detachable from the bump 5511.

In this case, if the user remotely permits remote control or manually selects a cycle to be started through the input unit 410, the control unit 900 may convert the door 200 to a locked state. First, if the fixing pin mover 590 detaches the fixing pin 589 from the release hole 594, the slider 580 may be pushed and slid by the elasticity of the hook head 2105. In this case, the latch contactor 554 positioned on the slider 580 may also move. That is, while the latch contactor 554 is pushed to one side by the inserted hook head 2105, eventually the entire slider 580 may move to a second position.

If the slider 580 is positioned at the second position, the coil spring 586 may be in a compressed state by the movement of the slider 580. In addition, the slider 580 may be in contact with the hook head 2105 so that the hook head 2105 may not be detached by the latch contactor 554. In this case, if the fixing pin 589 fixes the slider 580, the door 200 may be locked by the door lock unit 550.

To this end, the fixing pin 589 may be moved by the fixing pin mover 590 and inserted into the lock hole 592 formed through the slider 580. Therefore, the slider 580 may stop moving while the coil spring 586 is compressed, and eventually the hook head 2105 may be fixed to the latch inserter 551 by the latch contactor 554. As a result, the door 200 will be converted to a locked state.

If the user converts the locked state of the door 200 to an unlocked state, the control unit 900 may move the fixing pin 589 to an original position through the fixing pin mover 590. If the fixing pin 589 is returned to the original position, the slider 580 may be returned to the first position by the restoration force of the compressed coil spring 586. Eventually, as illustrated in FIG. 5 (section A), the latch contactor 554 may be separated from the hook head 2105, and the hook head 2105 may exit and then be separated from the latch inserter 551 when the user pulls the door 200 by applying external force.

Meanwhile, the door lock assembly 500 may further include the door sensing unit 510 for sensing the door 200 when the slider 580 is at the second position in order to check the locked state of the door 200. The control unit 900 may always check the locked state of the door 200 through the door sensing unit 510. The door sensing unit 510 may be a reed switch type but is not limited thereto.

The door sensing unit 510 may be provided to transmit a different signal to the control unit 900 according to whether the door is opened or closed. That is, the control unit 900 may determine whether the door is closed or opened through the signal received from the door sensing unit 510.

The control unit 900 may periodically check the signal received from the door sensing unit 510. For example, the control unit 900 may receive an electrical signal repeated at a period of 1 ms. Through the pattern of the received signal, the control unit 900 may check whether the door is closed or opened.

For example, the door sensing unit 510 may transmit a high signal and a low signal at a predetermined period. In addition, the door sensing unit 510 may continuously transmit only the high signal or only the low signal. That is, the door sensing unit 510 may periodically repeat the high signal and the low signal or may transmit only a specific signal among the high signal and the low signal. Accordingly, the control unit 900 may check whether the door is opened or closed through a difference in pattern between the signals.

Alternatively, the door sensing unit 510 may be provided separately from the door sensing unit 510. For example, a tactile switch in the circumferential part 112 may be used to sense whether the door 200 is opened or closed. When the door 200 is closed, the tactile switch is pressed by a protrusion (not illustrated) provided in the door 200. That is, the tactile switch may be switched from an off state to an on state. Accordingly, it may be determined that the door is closed while the tactile switch is kept on. Obviously, the reverse case may also be possible. Accordingly, different signals are transmitted to the control unit 900 in the on and off states of the tactile switch, and the control unit 900 may determine whether the door 200 is closed through these signals.

As another example, the door sensing unit 510 may be configured by a magnet and a reed switch. The magnet may be provided in the door 200, and the reed switch may be provided in the cabinet front surface 110, specifically, the circumferential part 112. Accordingly, as the door 200 is closed, the magnet may actuate the reed switch. Accordingly, whether the door 200 is closed may be determined according to whether the reed switch is actuated.

In any case, the control unit 900 may determine whether the door 200 is in an opened state or a closed state through the door sensing unit 510 according to an embodiment of the present disclosure. The laundry treatment apparatus 1000 may be prevented, through the door sensing unit 510, from being operated in a state in which the door 200 is opened. It is apparent that, while the door 200 is opened, the laundry treatment apparatus 1000 may be prevented from being operated by remote control.

Meanwhile, referring to FIG. 5 (sections A and B), the fixing pin mover 590 may move the fixing pin 589 using a bimetal principle. However, a moving manner is not limited thereto, and the control unit 900 may use another method to move the fixing pin mover 590. For example, the fixing pin mover 590 may move the fixing pin 589 using a solenoid.

Figure 6:
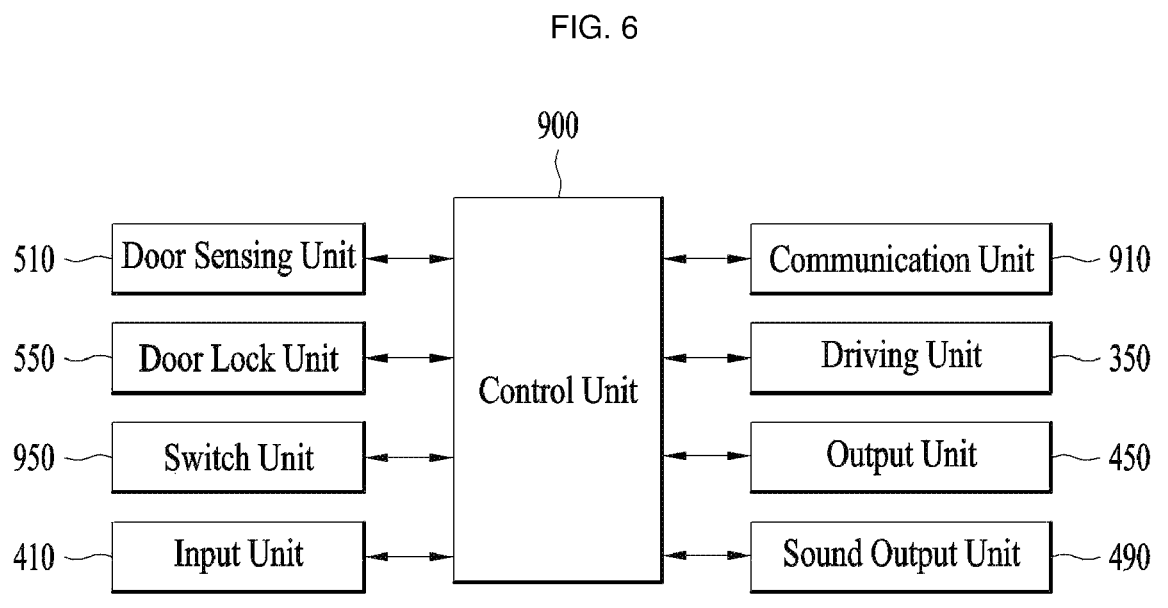

FIG. 6 is an example of an internal block diagram of the laundry treatment apparatus 1000. That is, the control unit 900 may control the communication unit 910 for communication with an external device, the driving unit 350 for rotating the drum, the switch unit 950 for connecting and disconnecting an external power, the door lock unit 550 for converting the door 200 to a locked state/unlocked state, the door sensing unit 510 for sensing the door locked state, the input unit 410 for sensing a remote input or manual input of the user and transmitting the sensed input to the control unit 900, and the output unit 450 for outputting the processing states and results of the laundry treatment apparatus 1000. In addition, when the laundry treatment apparatus 1000 further includes an audio output unit (or sound output device) 490, for example, a speaker, that notifies the user of output through sound, the control unit 900 may also control the audio output unit 490.

Figure 7:
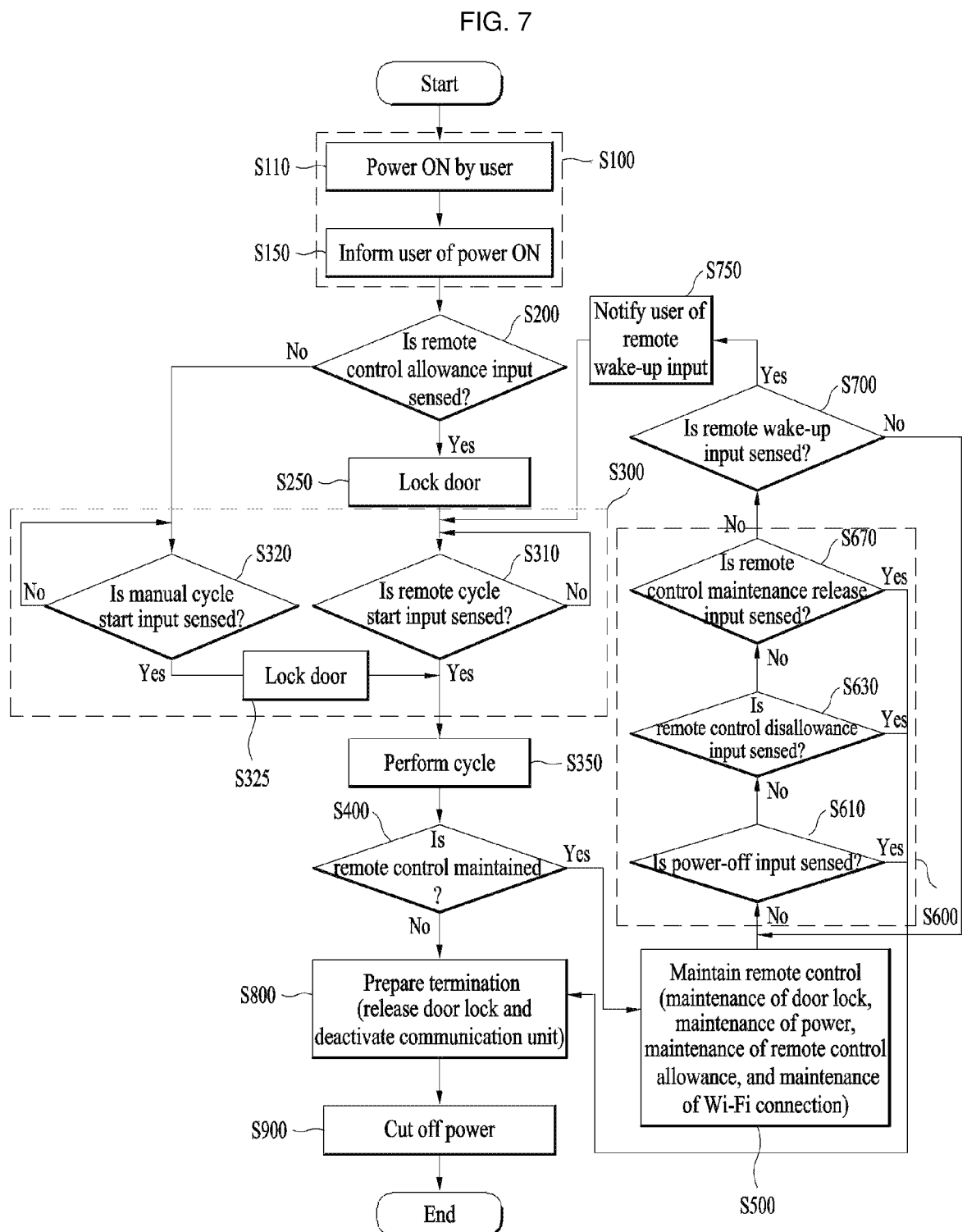
FIG. 7 is a flowchart of a control method of a laundry treatment apparatus according to the present disclosure.

FIG. 7 is a flowchart of a control method of the laundry treatment apparatus. In a conventional laundry treatment apparatus, the user selects a desired cycle, for example, a washing cycle or a spin-dry cycle, by manually manipulating a control panel and then should manually input a cycle start input. That is, before a preset cycle for rotating the drum is performed, the user should directly press or touch a start button to start the cycle. If the user presses the start button, the control unit activates the door locking unit 550 to convert the door to a locked state and then may start the cycle. After the cycle is completed, the door may be converted to an unlocked state and power may be cut off.

If the user remotely controls the laundry treatment apparatus, the user should directly press a remote control allowance button on the control panel. Then, the control unit may receive and process a remote input through the terminal 700 of the user. The reason why the user has to press the remote control allowance button through a manual input is to prevent safety-related accidents.

If remote control is activated, the control unit 900 activates the door lock unit 550 to convert the door to a locked state. This serves to prevent another user from opening the door during remote control of the user.

In addition, if remote control is activated (or if remote control is in an available state), the control unit 900 may check whether the door 200 is opened or closed through the door sensing unit 510. The control unit 900 may perform a control operation such that remote control is activated through the remote control input unit 415 in a state in which the door 200 is sensed to be closed through the door sensing unit 510 and remote control is deactivated through the remote control input unit 415 in a state in which the door is sensed to be opened through the door sensing unit 510. That is, it may be desirable to perform a control operation such that remote control activation is performed basically on the premise that the door is closed. If the door 200 is in an opened state, the control unit 900 may not activate remote control.

After activating remote control, if the control unit 900 senses the remote input transmitted from the terminal 700, the control unit 900 may sense whether the door 200 is opened or closed through the door sensing unit 510. That is, basically, the laundry treatment apparatus 1000 may be controlled to be operated according to the remote input on the premise that the door 200 sensed continuously through the door sensing unit 510 is in a closed state. Therefore, when the laundry treatment apparatus 1000 performs an operation according to the remote input, issues that may occur when the door 200 is opened may be prevented in advance.

If the user selects the power input unit 411, the control unit 900 may control the panel unit to be turned on by allowing an external power to be connected to and applied to the laundry treatment apparatus through the switch unit 950. However, in order to reduce power consumption, it is desirable that the control unit 900 controls the panel unit 400 to be turned off in a remote control maintenance operation, i.e., in a remote control standby mode, to be described later.

As described above, the operation of the laundry treatment apparatus according to the remote input may be performed only after the door is converted to a locked state. On the other hand, according to the safety standards of the IEC, if door lock is released after a cycle selected by the user through remote control is finished, the user is incapable of performing remote control again. This is to prevent accidents that may occur in the meantime when the door is locked again after door lock is unlocked. Therefore, according to the safety standards of the IEC, when the door locked state is released, the user should necessarily manually activate remote control using the remote control input unit 415.However, from the viewpoint of the user, after the selected cycle through remote control is performed, the user may want to additionally perform a washing cycle or a spin-dry cycle.

In order to satisfy both the safety standards of the IEC and the needs of the user, according to a control method of the present disclosure, the user sets remote control maintenance through the terminal 700 until a preset cycle through remote control is completed. If the control unit 900 senses control information corresponding to a remote control maintenance input through the communication unit 910, the control unit 900 may not convert a locked state of the door to a release state. That is, the user may perform remote control again because the locked state of the door 200 has not been changed since the user first inputs remote control allowance.

To this end, the control method of the present disclosure may include a remote allowance sensing operation (S200) of sensing a remote control allowance input of the user through the remote control input unit 415 provided in the input unit 410, a cycle start sensing operation (S300) of locking the door 200 through the door lock unit 550 upon sensing the remote control allowance input of the user and sensing a remote cycle starting input of the user through the communication unit 910, a cycle performing operation (S350) of rotating the drum by controlling the driving unit for rotating the drum upon sensing the remote cycle start input, a remote maintenance sensing operation (S400) of sensing a remote control maintenance input of the user through the communication unit until the cycle performing operation is completed, and a remote maintenance operation (S500) of maintaining connection to an external power through the switch unit 950 for connecting or disconnecting the external power after the cycle performing operation is completed and maintaining a locked state of the door through the door lock unit 550.

Referring to FIG. 7, a power supply operation (S100), in which the user first connects the laundry treatment apparatus 1000 to an external power using the power input unit 411 provided in the panel unit 400 and the control unit 900 informs the user that the laundry treatment apparatus is in an initial state, may be performed. In the power supply operation (S100), when the control unit 900 senses a power supply input through the power input unit 411, the control unit 900 may connect the external power using the switch unit 950 and inform the user through the sound output unit 490 that power has been connected and the laundry treatment apparatus has become an initial state or an available standby state (S510).

That is, the control unit 900 may output preset sound through the audio output unit 490. The initial state or the standby state may refer to a state in which the laundry treatment apparatus is ready to receive inputs of the user as a result of checking whether various circuits operate properly after power is supplied.

Connection to the external power through the switch unit 950 may mean supplying electricity to the inside of the laundry treatment apparatus through electrical control while a plug of the laundry treatment apparatus is inserted into an outlet. The control unit 900 may use a relay scheme to control power connection.

If power is connected, the control unit 900 may activate the communication unit 910. That is, the control unit 900 may connect the laundry treatment apparatus 1000 to the Internet or another communication network to which the laundry treatment apparatus is connected through the communication unit 910. For example, if the laundry treatment apparatus 1000 is used at home, the laundry treatment apparatus may be connected to a broadband router used at home through Wi-Fi.

Once connection to the communication unit 910 is established using the communication activation input unit 417, it is unnecessary to establish connection again because the control unit 900 stores corresponding access information until connection is changed for access to another router. Therefore, in the present specification, it is assumed that connection to the Internet network through the communication unit 910 has already been made.

If the user turns on the laundry treatment apparatus and then the control unit 900 connects the laundry treatment apparatus to a preset Internet network through the communication unit 910, the control unit 900 may inform the user that the communication unit 910 has been activated, i.e., has entered a state capable of communicating with an external device by illuminating a light emitting member, for example, an LED, provided in the communication display unit 451. Hereinafter, if an arbitrary display unit is illuminated, this means that a function corresponding to the display unit is activated. In addition, if a certain display unit is illuminated, this means that the light emitting member for visually notifying the user of the activation of the corresponding display unit is lit and thus the user is in a visually recognizable state.

Thereafter, the control method of the present disclosure may include the remote allowance sensing operation (S200) of sensing whether the user manually inputs a remote control allowance input through the remote control input unit 415. For example, if the user presses a button corresponding to the remote control input unit 415, the control unit 900 senses the remote control allowance input, receives, through the communication unit 910, the remote control allowance input transmitted through the terminal 700 of the user, and activates remote control so as to process the remote control allowance input. In this case, the remote display unit 453 may be illuminated. If the user presses the button corresponding to the remote control input unit 415 again, the control unit 900 may deactivate remote control.

On the other hand, if the remote control allowance input of the user is sensed in the remote allowance sensing operation (S200) and remote control is activated, the door 200 may be converted to a locked state (S250) according to the control method of the present disclosure. That is, the control unit 900 may lock the door through the door lock unit 550.

Thereafter, the control method of the present disclosure may include the cycle start sensing operation (S300) of sensing a cycle start input remotely selected by the user. Since the user has already allowed remote control, the user may cut off the power connection or deactivate remote control by pressing the remote control input unit 415 and the power input unit 411 again, but other manual inputs may not be allowed. This serves to prevent an accident in which another user controls the laundry treatment apparatus through a manual input while one user controls the laundry treatment apparatus through remote control.

Therefore, if remote control is allowed, the control method of the present disclosure may include the cycle start sensing operation (S300) of sensing a remote cycle start input (S310) through the terminal 700 of the user in order to perform the cycle selected by the user. The remote cycle start sensing operation (S300) may wait until the remote cycle start input is sensed. If the remote cycle start input is not sensed during a preset sensing time, the power may be cut off to end the operation.

In the remote control allowance sensing operation (S200), if the control unit 900 senses a manual cycle start input (S320) for starting a preset cycle selected by the user directly through the panel unit 400, instead of the remote control allowance input of the user, the door 200 is locked (S325) and the drum 300 is rotated in order to perform the cycle selected by the user according to the control method of the present disclosure. Here, the cycle refers to a course of separating foreign substances from laundry or dehydrating the laundry by rotating the drum 300. Although the manual operation start sensing operation (S320) and the remote cycle start sensing operation (S310) are collectively referred to as the cycle start sensing operation (S300), the control method of the present disclosure may include only one operation depending on whether remote control is permitted.

Upon sensing the remote control allowance input, the control unit 900 may convert the door 200 to a locked state through the door locking unit 550 and then wait for the remote cycle start input. However, upon sensing the manual cycle start input instead of the remote control allowance input, the control unit 900 may convert the door 200 to a locked state and then rotate the drum in order to perform the selected cycle. That is, the control method of the present disclosure may differently perform converting the door 200 to the locked state depending on whether remote control is allowed.

Upon sensing a manual cycle start input of the user in the manual cycle start sensing operation (S320) or sensing a remote cycle start input in the remote cycle start sensing operation (S310), the cycle performing operation (S350) of performing the cycle selected by the user may be performed according to the control method of the present disclosure. In the cycle performing operation (S350), the control unit 900 may rotate the drum through the driving unit 350 which rotates the drum.

If the cycle performing operation (S350) is ended, the control method of the present disclosure may include determining whether a remote control maintenance input is set. The user may set remote control maintenance so as to maintain remote control through the terminal 700 until the cycle is ended since the user has allowed remote control in the remote control allowance sensing operation (S200). If the user sets the remote control maintenance, the terminal 700 transmits a remote control maintenance input. The control unit 900 according to the control method of the present disclosure may receive the remote control maintenance input, maintain remote control (S500) without deactivating remote control after the cycle performing operation (S350) is finished, and wait to perform another remote input of the user (S600).

This is to follow the safety standards of the IEC and to perform another cycle after performing a preset cycle by remote control. For example, referring to FIG. 2, while remotely controlling the laundry treatment apparatus 1000 to perform the cycle selected by the user, the user may set remote control of the laundry treatment apparatus 1000 to be maintained through an application of the smartphone of the user.

Upon sensing a remote control maintenance input of the user, the control unit 900 may maintain the locked state of the door 200 after the cycle performing operation (S350) is ended, maintain the power connection of the switch unit 950, maintain an activation state (e.g., Wi-Fi connection) of the communication unit 910, and maintain a remote control activation state. This is referred to as the remote maintenance operation (S500).

The remote control maintenance input may be set by the user through the terminal 700 up to the remote maintenance sensing operation (S400). If the remote control maintenance input is not sensed, the control method of the present disclosure includes a termination preparation operation (S800) of preparing to stop the laundry treatment apparatus 1000. In the termination preparation operation (S800), the control unit 900 may convert the locked state of the door to an unlocked state through the door lock unit 550. In the unlocked state of the door 200, the user may open the door 200. In addition, the control unit 900 may turn off the power of the panel unit 400 to turn off all the display units provided in the input unit 410 and the output unit 450.

Upon completion of the termination preparation operation (S800), the control method of the present disclosure may include a power-off operation (S900) of cutting off the power. In the power-off operation (S900), the control unit 900 may control the switch unit 950 to release connection to the external power.

On the other hand, the control method of the present disclosure includes a termination input sensing operation (S600) of determining whether a remote or manual input of the user related to remote control termination in the remote maintenance operation (S500). According to the control method of the present disclosure, the termination input sensing operation (S600) may be continuously and repeatedly performed until a remote wake-up input of the user is sensed in a remote wake-up input sensing operation S700 which will be described later.

In the termination input sensing operation (S600), the control unit 900 according to the control method of the present disclosure may sense whether the user selects a power-off input remotely or manually. That is, if the user remotely selects the power-off input through the terminal 700, the control unit 900 according to the control method of the present disclosure may sense the remote power-off input and sequentially terminate the remote maintenance operation (S500). Then, the termination preparation operation (S800) and the power-off operation (S900) may be performed.

The power-off input of the user may be performed manually as well as remotely. That is, if the user presses again or touches again the button of the power input unit 411 provided in the panel unit 400, the control unit 900 according to the control method of the present disclosure may sense the manual power-off input of the user and terminate the remote maintenance operation (S500) similar to the case of the remote power-off input. Then, the control unit 900 may perform the termination preparation operation (S800) and the power-off operation (S900).

The termination input sensing operation (S600) may further include an operation of sensing whether the user selects a remote control disallowance input for deactivating remote control through the input unit 410 (S630). In addition to the power-off input for cutting off power, if the user directly selects the remote control disallowance input through the panel unit 400, the control unit 900 according to the control method of the present disclosure may sense the remote control disallowance input and terminate the remote maintenance operation (S500). Then, the termination preparation operation (S800) and the power-off operation (S900) may be performed.

The user may deactivate remote control by pressing again or touching again a button provided in the remote control input unit 415. For safety reasons, activation and deactivation of remote control is incapable of being remotely selected through the terminal 700 of the user and necessarily should be directly selected by the user.

In addition, the termination input sensing operation (S600) may further include an operation of sensing whether the user selects a remote control maintenance release input through the terminal 700 (S670). For example, the user may deactivate remote control by releasing remote control maintenance through an application installed on the smartphone. When the user releases remote control maintenance through the terminal, the control unit 900 according to the control method of the present disclosure may deactivate remote control to terminate the remote maintenance operation (S500) and perform the termination preparation operation (S800) and the power-off operation (S900).

According to the control method of the present disclosure, the termination input sensing operation (S600) may be continuously performed while maintaining remote control for the laundry treatment apparatus 1000 (S500). That is, after performing the cycle of rotating the drum 300 (S350), the laundry treatment apparatus 1000 may wait to sense the next input of the user while activating remote control. This serves to minimize power consumption of the laundry treatment apparatus 1000.

If the user selects a wake-up input of the laundry treatment apparatus 1000 through the terminal 700, the control unit 900 may sense the remote wake-up input (S700). That is, according to the control method of the present disclosure, when the remote wake-up input of the user is sensed, the remote maintenance operation (S500) may proceed to the cycle start sensing operation (S300).

When the remote wake-up input is sensed, the control unit 900 according to the control method of the present disclosure may perform a wake-up notification operation (S750) for notifying the user that the remote wake-up input has been sensed and then perform the cycle start sensing operation (S300). That is, upon sensing the remote wake-up input received through the communication unit 910, the control unit 900 may output preset sound through the sound output unit 490 to inform the user of a state capable of receiving and processing the remote input of the user. Thereafter, upon sensing the remote cycle start input for starting the cycle selected through the terminal 700 of the user, the control unit 900 may rotate the drum according to the selected cycle.

Therefore, the control unit 900 may maintain the locked state of the door 200 according to the remote control maintenance input of the user and continue to receive and process another remote input of the user without deactivation of remote control, cutoff of the power, or unlocking of the door. The control method of the present disclosure may notify the user of whether the communication unit is activated, whether the door is locked, or whether remote control is permitted, through the output unit 450 according to each of the above-described operations.

Figure 8:
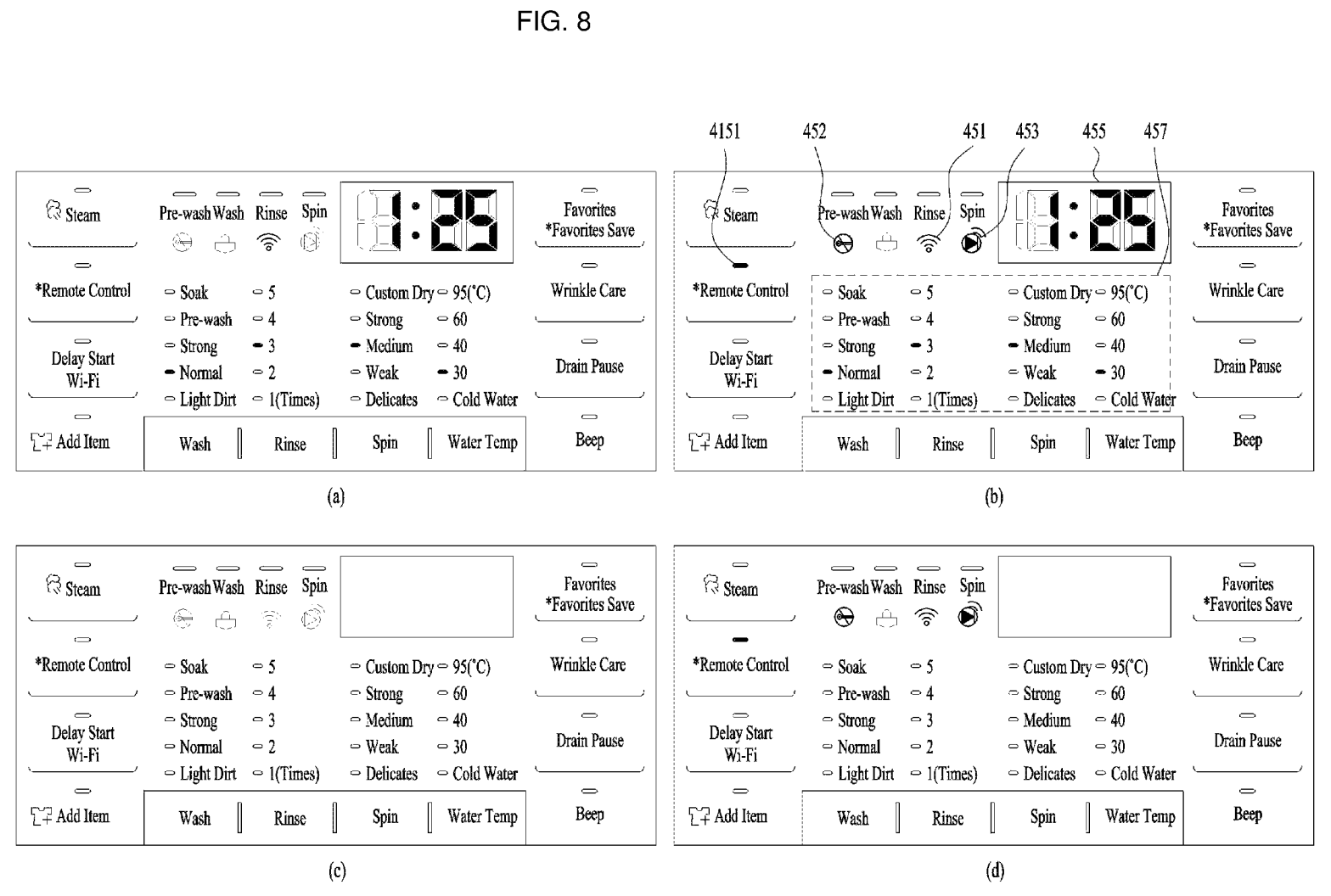

FIG. 8 (section A) illustrates an example in which, when the user connects the laundry treatment apparatus to an external power through the power input unit 411 (S100), the control unit 900 activates the communication unit 910 and illuminates the communication unit 910 to indicate that the laundry treatment apparatus is capable of communicating with a smartphone of the user. An arbitrary default time may be displayed on the time display unit 455. When the user selects a desired cycle, the time displayed on the time display unit 455 will be changed according to the selected cycle.

The control unit 900 may inform the user that the laundry treatment apparatus is turned on and is in an initial state by outputting preset sound through the audio output unit 490. That is, the control unit 900 according to the control method of the present disclosure may inform the user that the communication unit 910 is activated and is in a communicable state by illuminating the communication display unit 451 in the interface unit 430 in the power supply operation (S100).

FIG. 8 (section B) illustrates an example of the interface unit 430 when the user permits remote control through the remote control input unit 415. That is, when the user presses or touches a button provided in the remote control input unit 415, the control unit 900 may sense a remote control allowance input. Upon sensing the remote control allowance input, the control unit 900 may illuminate the optical display unit 4141 of the remote control input unit 415 to inform the user that remote control is permitted. In addition, upon sensing the remote control allowance input, the control unit 900 may illuminate the communication display unit 451, the lock display unit 452, and the remote display unit 453. Therethrough, the control unit 900 may inform the user that the door 200 is locked, the communication unit 910 is activated, and remote control is activated. Since there is no cycle selected by the user yet, the control unit 900 may display the default time on the time display unit 455.

FIG. 8 (section C) is an example illustrating the interface unit 430 in the termination preparation operation (S800). The control unit 900 may rotate the drum 300 to perform a cycle selected by the user. If the user does not set remote control maintenance until the cycle is terminated, the control unit 900 according to the control method of the present disclosure may proceed to the termination preparation operation (S800). Accordingly, since remote control is no longer performed, the control unit 900 may release the locked state of the door 200. In addition, the control unit 900 may deactivate remote control by deactivating the communication unit 910.

Accordingly, the control unit 900 may release the locked state of the door 200 and deactivate all the display units of the interface unit 430. That is, the control unit 900 may cut off power supplied to the interface unit 430 to turn off all LEDs provided inside the interface unit 430. Thereafter, the control unit 900 may disconnect connection with the external power through the switch unit 950.

FIG. 8 (section D) illustrates an example of the interface unit 430 in the remote maintenance operation (S500). In this case, since the control unit 900 is waiting for a remote input of the user, the control unit 900 may cut off power except for power needed for essential operations such as the interface unit 430 and the communication unit 910. This serves to minimize power consumption during standby.

In the remote maintenance operation (S500), the control unit 900 may inform the user that remote control may be performed by illuminating the optical display unit 4151 of the remote control input unit 415. The control unit 900 may illuminate the communication display unit 451, the remote display unit 453, and the lock display unit 452 in order to notify the user that the communication unit 910 is activated, the remote control is activated, and the door is locked.

According to the present disclosure, an additional cycle may be performed by remote control after a cycle of rotating a drum, e.g., a washing cycle, is terminated. In addition, the present disclosure may continuously perform a washing cycle or a spin-drying cycle through rotation of the drum by remote control while satisfying safety standards. Therethrough, user satisfaction may be increased.

Accordingly, embodiments of the present disclosure are directed to a laundry treatment apparatus and a method of controlling the laundry treatment apparatus. Embodiments of the present disclosure provide a laundry treatment apparatus capable of performing an additional cycle by remote control after completing a cycle of rotating a drum, for example, a washing cycle, by remote control, and a method for controlling the laundry treatment apparatus. Embodiments of the present disclosure provide a laundry treatment apparatus capable of continuously performing a washing cycle or a dehydration cycle through rotation of a drum by remote control while satisfying safety standards, and a method for controlling the laundry treatment apparatus.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, there is provided a laundry treatment apparatus and a method of controlling the laundry treatment apparatus in which when a user selects remote control maintenance through a terminal having a communication function, for example, a smartphone, a control unit senses a remote control maintenance input and enters a standby state which is communicable with the smartphone of the user without releasing a door locked state of a door and without disconnecting an external power.

In an aspect of the present disclosure, a laundry treatment apparatus includes a cabinet having an opening formed in one side thereof, a door rotatably coupled to the cabinet to open and close the opening, a drum rotatably provided inside the cabinet and configured to accommodate laundry introduced through the opening, a door lock unit provided inside the cabinet and configured to lock the door when the door closes the opening or release a locked state of the door in order to open the opening closed by the door, a communication unit configured to receive remote inputs of a user for communication with an external device, a switch unit configured to connect or disconnect an external power, an input unit located on the cabinet and configured to receive manual inputs of the user, an output unit configured to output processing states according to the remote inputs and the manual inputs, and a control unit configured to control rotation of the drum, locking and unlocking of the door by the door lock unit, the communication unit, the switch unit, the input unit, and the output unit, according to the manual inputs or the remote inputs, Upon sensing a remote control maintenance input among the remote inputs through the communication unit until a preset cycle including rotation of the drum is terminated, the control unit may maintain connection to the external power through the switch unit and maintains the locked state of the door through the door lock unit, after the cycle is terminated.

Upon failing to sense the remote control maintenance input until the cycle is terminated, the control unit may release the locked state of the door through the door lock unit, after the cycle is terminated. The control unit may release connection to the external power through the switch unit after releasing the locked state of the door.

Upon sensing a remote maintenance termination input or a remote power-off input among the remote inputs through the communication unit while maintaining connection to the external power and the locked state of the door even after the cycle is terminated due to sensing of the remote control maintenance input until the cycle is terminated, the control unit may release the locked state of the door through the door lock unit and release connection to the external power through the switch unit.

The input unit may include a power input unit provided to connect or disconnect the external power, and a remote control input unit provided to allow or disallow remote control. Upon sensing a manual power-off input among the manual inputs through the power input unit or a remote control disallowance input among the remote inputs through the remote control input unit while maintaining connection to the external power and the locked state of the door even after the cycle is terminated due to sensing of the remote control maintenance input until the cycle is terminated, the control unit may release the locked state of the door through the door lock unit and release connection to the external power through the switch unit.

Upon sensing a remote wake-up input among the remote inputs through the communication unit while maintaining connection to the external power and the locked state of the door even after the cycle is terminated due to sensing of the remote control maintenance input until the cycle is terminated, the control unit may wait until a remote cycle start input among the remote inputs in order to rotate the drum while maintaining the locked state of the door. Upon sensing the remote wake-up input, the control unit may output preset sound through a sound output unit provided inside the cabinet.

The output unit may include a communication display unit configured to display an activation state in which the communication unit is communicable with an external device or a deactivation state, a lock display unit configured to display a state of the door locked or unlocked by the door lock unit, and a remote display unit configured to display an activation state of remote control in which the communication unit is remotely controllable or a deactivation state of remote control.

The input unit may include a power input unit provided to connect or disconnect the external power, and a remote control input unit provided to allow or disallow remote control. Upon sensing a manual power connection input and a remote control allowance input among the manual inputs through the power input unit and the remote control input unit, respectively, the control unit may display activation state of the communication unit, the locked state of the door, and the activation state of remote control through the communication display unit, the lock display unit, and the remote display unit, respectively.

Upon sensing the remote control maintenance input until the cycle is terminated, the control unit may maintain displaying through the communication display unit, the lock display unit, and the remote display unit, and upon failing to sense the remote control maintenance input until the cycle is terminated, the control unit may release displaying through the communication display unit, the lock display unit, and the remote display unit.

In another aspect of the present disclosure, a method of controlling a laundry treatment apparatus including a cabinet having an opening formed in one side thereof, a door rotatably coupled to the cabinet to open and close the opening, a drum rotatably provided inside the cabinet and configured to accommodate laundry introduced through the opening, a door lock unit provided inside the cabinet and configured to lock the door when the door closes the opening or release a locked state of the door, a communication unit configured to receive remote inputs of a user for communication with an external device and transmit processing states for the remote inputs; an input unit located on the cabinet and configured to sense manual inputs of the user, and an output unit configured to output processing states according to the remote inputs and the manual inputs, includes a remote allowance sensing operation of sensing a remote control allowance input among the manual inputs through a remote control input unit provided in the input unit, a cycle start sensing operation of locking the door through the door lock unit and sensing a remote cycle start input among the remote inputs through the communication unit, upon sensing the remote control allowance input through the remote control input unit, a cycle performing operation of rotating the drum, upon sensing the remote cycle start input, a remote maintenance sensing operation of sensing a remote control maintenance input among the remote inputs until the cycle performing operation is ended, and a remote maintenance operation of maintaining connection to the external power through a switch unit configured to connect or disconnect the external power and maintaining the locked state of the door through the door lock unit, after the cycle performing operation is ended, upon sensing the remote control maintenance input. Upon sensing a remote wake-up input among the remote inputs while performing the remote maintenance operation, the cycle start sensing operation may be reperformed.

The method may further include a termination input sensing operation of sensing a remote maintenance termination input or a remote power-off input among the remote inputs while performing the remote maintenance operation, and a termination preparation operation of releasing the locked state of the door through the door lock unit and turning off the output unit, upon sensing the remote maintenance termination input or the remote power-off input in the termination input sensing operation. The termination input sensing operation may proceed to the termination preparation operation even upon sensing a remote control disallowance input among the remote inputs.

The cycle start sensing operation may further include sensing a manual cycle start input entered through a start input unit provided in the input unit among the manual inputs, upon failing to sense the remote control allowance input in the remote allowance sensing operation, and the door lock unit may lock the door before the cycle performing operation is performed upon sensing the manual cycle start input.

The method may further include a termination preparation operation of releasing the locked state of the door through the door lock unit and turning off the output unit, upon termination of the cycle performing operation based on the manual cycle start input. The method may further include a power-off operation of releasing connection to the external power through the switch unit after the termination preparation operation.

The termination preparation operation may include cutting off power supply to the output unit. The remote allowance sensing operation may include displaying activation of the communication unit, locking of the door, and activation of remote control through a communication display unit, a lock display unit, and a remote display unit, respectively, upon sensing the remote allowance sensing input. The remote maintenance operation may include maintaining displaying through the communication display unit, the lock display unit, and the remote display unit displayed in the remote allowance sensing operation.

It is to be understood that both the foregoing general description and the following detailed description of the present disclosure are exemplary and explanatory and are intended to provide further explanation of the disclosure as claimed.

It will be apparent to those skilled in the art that various modifications and variations can be made in the present disclosure without departing from the spirit or scope of the disclosure. Thus, it is intended that the present disclosure covers the modifications and variations of this disclosure provided they come within the scope of the appended claims and their equivalents.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A laundry treatment apparatus, comprising:
a cabinet having an opening formed in one side thereof;
a door rotatably coupled to the cabinet to open and close the opening;
a drum rotatably provided inside the cabinet and configured to accommodate laundry introduced through the opening;
a door lock provided at the cabinet and configured to lock the door when the door closes the opening or release a locked state of the door to allow the door to open the opening;
a communication interface configured to receive one or more remote inputs of a user from an external device;
a switch configured to connect to or disconnect from an external power;

an input device located on the cabinet and configured to receive one or more manual inputs of the user;
an output device configured to output information regarding a state of the laundry treatment apparatus according to the remote inputs and the manual inputs; and
a control unit configured to control rotation of the drum, locking and unlocking of the door by the door lock, the communication interface, the switch, the input device, and the output device, according to at least one of the manual inputs or the remote inputs,
wherein, when the communication interface receives a remote control maintenance input before a cycle including rotation of the drum is terminated, the control unit maintains connection to the external power through the switch and maintains the locked state of the door through the door lock after the cycle is terminated,
wherein, when the communication interface further receives at least one of a remote maintenance termination input or a remote power-off input while the switch maintains connection to the external power and the door lock maintains the locked state of the door after the cycle is terminated based on the communication interface receiving the remote control maintenance input before the cycle is terminated, the control unit releases the locked state of the door through the door lock and releases connection to the external power through the switch, and
wherein, when the communication interface receives a remote wake-up input while the switch is maintaining connection to the external power and the door lock maintains the locked state of the door after the cycle is terminated based on the communication interface receiving the remote control maintenance input before the cycle is terminated, the control unit waits until the communication interface receives a remote cycle start input to rotate the drum while the door lock is maintaining the locked state of the door.
2. The laundry treatment apparatus of claim 1, wherein, when the communication interface does not receive the remote control maintenance input before the cycle is terminated, the control unit releases the locked state of the door through the door lock after the cycle is terminated.
3. The laundry treatment apparatus of claim 2, wherein, when the communication interface does not receive the remote control maintenance input before the cycle is terminated, the control unit releases connection to the external power through the switch after the cycle is terminated and after releasing the locked state of the door.
4. The laundry treatment apparatus of claim 1, wherein the input device receives an input on whether to connect or disconnect the external power; and receives an input on whether to allow or disallow remote control,
wherein, when the input device receives a manual power-off input or the communication interface receives a remote control disallowance input while the switch maintains connection to the external power and the door lock maintains the locked state of the door after the cycle is terminated based on the communication interface receiving the remote control maintenance input before the cycle is terminated, the control unit releases the locked state of the door through the door lock and releases connection to the external power through the switch.
5. The laundry treatment apparatus of claim 1, wherein, upon the communication interface receiving the remote wake-up input, the control unit controls a sound output device provided inside the cabinet to output a preset sound.

6. The laundry treatment apparatus of claim 1, wherein the output device is configured to display:

an activation state in which the communication interface is activated to communicate with the external device or a deactivation state in which the communication interface is deactivated;

whether the door is locked unlocked by the door lock; and whether the laundry treatment apparatus is remotely controllable.

7. The laundry treatment apparatus of claim 6, wherein the input device is configured to receive:

an input on whether to connect or disconnect the external power; and an input on whether to allow or disallow remote control, and wherein, upon the input device receiving a manual power connection input and a remote control allowance input, the control unit controls the display device to display an indication of the activation state of the communication interface, that the door is in the locked state, and that the laundry treatment apparatus is remotely controllable.

8. The laundry treatment apparatus of claim 7, wherein, when the communication interface receives the remote control maintenance input before the cycle is terminated, the control unit controls the display device to continue to display the indication of the activation state of the communication interface, that the door is in the locked state, and that the laundry treatment apparatus is remotely controllable, and wherein, when the communication interface does not receive the remote control maintenance input before the cycle is terminated, the control unit controls the display device to cease displaying the indication of the activation state of the communication interface, to cease displaying that the door is in the locked state, and to cease displaying that the laundry treatment apparatus is remotely controllable.

9. A method of controlling a laundry treatment apparatus comprising a cabinet having an opening formed in one side thereof; a door rotatably coupled to the cabinet to open and close the opening; a drum rotatably provided inside the cabinet and configured to accommodate laundry introduced through the opening; a door lock provided at the cabinet and configured to lock the door when the door closes the opening or release a locked state of the door; a communication interface configured to receive one or more remote inputs from an external device; an input device located on the cabinet and configured to sense one or more manual inputs; and an output device configured to output information regarding a state of the laundry treatment apparatus according to the remote inputs and the manual inputs, the method comprising:

performing a remote allowance sensing operation that includes sensing a remote control allowance input through a remote control input unit provided in the input device;

performing a cycle start sensing operation that incudes locking the door through the door lock and sensing a remote cycle start input through the communication interface, after sensing the remote control allowance input through the remote control input unit;

performing a cycle performing operation that includes rotating the drum, upon sensing the remote cycle start input through the communication interface;

performing a remote maintenance sensing operation that includes sensing a remote control maintenance input through the communication interface before the cycle performing operation is ended; and performing a remote maintenance operation that includes maintaining connection to external power through a switch and maintaining the locked state of the door through the door lock, after the cycle performing operation is ended and upon sensing the remote control maintenance input, wherein the remote allowance sensing operation includes displaying indications of activation of the communication interface, locking of the door by the door lock, and activation of remote control through a communication display unit, a lock display unit, and a remote display unit, respectively, in response to sensing the remote allowance sensing input, and wherein the remote maintenance operation includes continuing to display the indications of activation of the communication interface, locking of the door by the door lock, and activation of remote control through the communication display unit, the lock display unit, and the remote display unit after the remote allowance sensing operation.

10. The method of claim 9, further comprising:

reperforming the cycle start sensing operation sensing a remote wake-up input from the external device while performing the remote maintenance operation.

11. The method of claim 10, further comprising:

performing a termination input sensing operation that includes sensing a remote maintenance termination input or a remote power-off input from the external device while performing the remote maintenance operation; and performing a termination preparation operation that includes releasing the locked state of the door through the door lock and turning off the output device, upon sensing the remote maintenance termination input or the remote power-off input during the termination input sensing operation.

12. The method of claim 11, wherein the termination input sensing operation ends and the termination preparation operation is initiated when a remote control disallowance input is received from the external device.

13. The method of claim 9, wherein the cycle start sensing operation further includes sensing a manual cycle start input entered through a start input unit provided in the input device when the remote control allowance input is not received from the external device during the remote allowance sensing operation, and wherein the door lock locks the door before the cycle performing operation is performed in response to sensing the manual cycle start input.

14. The method of claim 13, further comprising performing a termination preparation operation that includes releasing the locked state of the door through the door lock and turning off the output device, upon termination of the cycle performing operation based on sensing the manual cycle start input.

15. The method of claim 14, further comprising performing a power-off operation that includes releasing connection to the external power through the switch after the termination preparation operation.

16. The method of claim 15, wherein the termination preparation operation includes cutting off power to the output device.

* * * * *